(12) United States Patent
Sherrer et al.

(10) Patent No.: US 6,363,201 B2
(45) Date of Patent: Mar. 26, 2002

(54) FIBER ARRAY WITH WICK-STOP TRENCH FOR IMPROVED FIBER POSITIONING

(75) Inventors: David W Sherrer, Blacksburg; James C. Hurst, Jr., Wytheville, both of VA (US)

(73) Assignee: Haleos, Inc., Blacksburg, VA (US)

( * ) Notice: Subject to any disclaimer, the term of this patent is extended or adjusted under 35 U.S.C. 154(b) by 0 days.

(21) Appl. No.: 09/742,179

(22) Filed: Dec. 20, 2000

Related U.S. Application Data

(63) Continuation-in-part of application No. 09/526,922, filed on Mar. 16, 2000, now Pat. No. 6,215,946.

(51) Int. Cl.⁷ .................................................. G02B 6/00
(52) U.S. Cl. ........................................ 385/137; 385/49
(58) Field of Search ............................. 385/14, 52, 65, 385/49, 88, 89, 92, 137, 147

(56) References Cited

U.S. PATENT DOCUMENTS 5,659,647 A * 8/1997 Kravitz et al. ................. 385/52
5,909,524 A * 6/1999 Tabuchi ......................... 385/49
6,215,946 B1 * 4/2001 Sherrer ......................... 385/137

* cited by examiner

Primary Examiner—Akm E. Ullah
(74) Attorney, Agent, or Firm—D. Steinberg; Martin Meder

(57) ABSTRACT

A V-groove chip for fiber arrays having a wick stop trench. The wick stop trench intersects the V-grooves and is preferably deeper than the V-grooves. The wick stop trench prevents adhesive from moving via capillary action along the entire length of a V-groove. This is very useful for manufacturing V-groove fiber arrays because often it is desirable to adhesive the fiber to the V-groove chip in multiple gluing steps. For example, two gluing steps are beneficial if rotational alignment of the fiber (e.g., for polarization maintaining fiber arrays) is desired. Also, if longitudinal alignment of the fiber is desired, two gluing steps are beneficial. Two gluing steps allows the front and rear portions of the optical fiber to be secured independently, thereby improving precision in fiber placement. Preferably, the wick stop trench is filled with solidified adhesive.

26 Claims, 7 Drawing Sheets

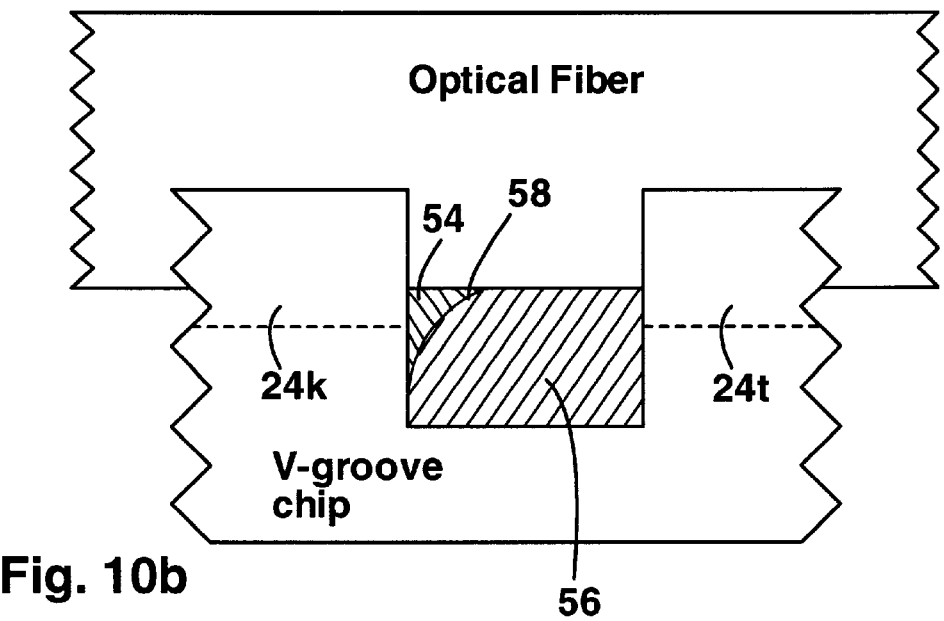
Fig. 10b
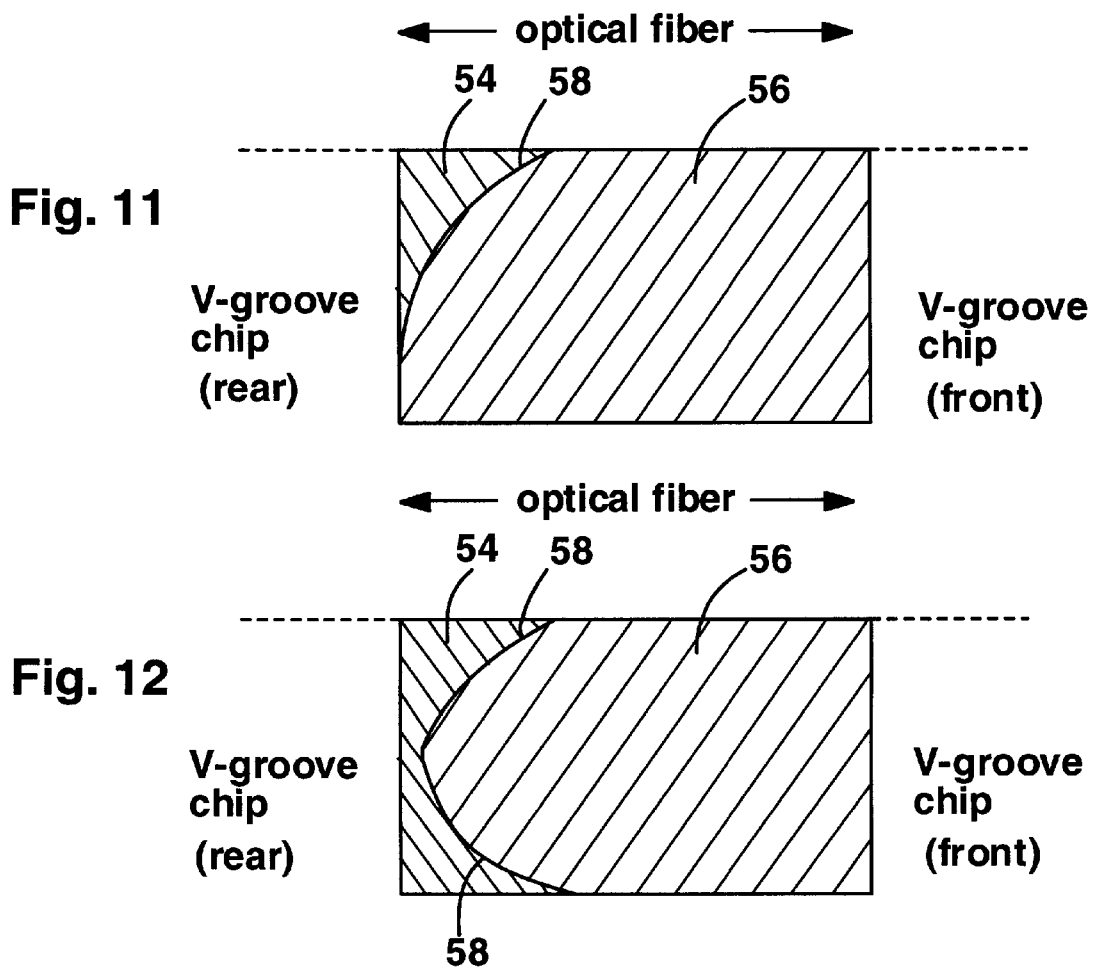
Fig. 11
Fig. 12

US 6,363,201 B2

FIBER ARRAY WITH WICK-STOP TRENCH FOR IMPROVED FIBER POSITIONING

RELATED APPLICATIONS

The present patent application is a continuation-in-part of parent patent application Ser. No. 09/526,922, filed on Mar. 16, 2000 now U.S. Pat. No. 6,215,946. The present application claims the benefit of priority of the parent application.

FIELD OF THE INVENTION

The present invention relates generally to optical fiber arrays and micromachined chips used in optical fiber arrays. More specifically, it relates to a V-groove chip having a wick stop trench to prevent the uncontrolled wicking and movement of adhesive during manufacture of a V-groove fiber array.

BACKGROUND OF THE INVENTION

Micromachined V-groove chips are commonly used in the optical fiber industry and photonics industry to align and position optical fibers. Typically, V-groove fiber arrays are made by placing optical fibers in V-grooves of a V-groove chip, placing a lid on the fibers, and then securing the assembly with adhesive. The lid can be a V-groove chip or a flat silicon or glass plate. The adhesive is typically a UV-curable or heat-curable epoxy.

The optical fibers must be carefully located in the V-grooves during manufacture of the array. Specifically, the optical fibers must be disposed in contact with the surfaces of the V-grooves. Also, for fiber arrays having polarization-maintaining fiber, the optical fibers must have an accurate rotational alignment. Also, some fiber arrays need to have optical fibers placed so that the fiber endfaces are fixed at different longitudinal positions.

It can be difficult to position optical fibers in conventional V-groove chips. This is because adhesive used to secure the fibers wicks by capillary action into the small spaces between the fibers and V-grooves. Since the adhesive wicks into these spaces, the entire length of the fiber is secured to the V-groove chip in a single step. It is not possible to secure the fiber in the V-groove in multiple gluing steps. This is a problem for certain fiber arrays because multiple gluing steps can improve the alignment of optical fibers.

U.S. Pat. No. 5,257,332 to Pimpinella discloses a fiber coupler having v-groove chips.

U.S. Pat. No. 5,748,822 to Miura et al. discloses a module for connecting an optical fiber to an optical element such as a laser diode. The module has a vertical groove cut perpendicular to the V-grooves. The vertical groove is positioned to abut the fiber endface and provide longitudinal positioning of the optical fiber.

OBJECTS AND ADVANTAGES OF THE INVENTION

Accordingly, it is a primary object of the present invention to provide a V-groove chip that:

1) controls wicking of adhesive so that optical fibers can be glued in multiple gluing steps;
2) provides for improved alignment of optical fibers in a V-groove chip;
3) provides for improved longitudinal alignment of optical fibers;
4) provides for improved rotational alignment optical fibers.

These and other objects and advantages will be apparent upon reading the following description and accompanying drawings.

SUMMARY OF THE INVENTION

These objects and advantages are attained by a V-groove chip having a wick stop trench. The wick stop trench intersects the V-groove. An optical fiber is disposed in the V-groove and crosses over the wick stop trench. The wick stop trench is filled with adhesive. The wick stop trench prevents adhesive from moving via capillary action along the entire length of the V-groove. This provides increased control over adhesive application and placement of the fiber in the V-groove. Preferably, the wick stop trench is deeper than the V-groove.

Preferably, the wick stop trench has vertical sidewalls. Also, the trench can be cut using a dicing saw.

The trench can have a width of about 20–500 microns or wider. More preferably the width is in the range of 100–200 microns. The wick stop trench can even be 1–5 mm wide if desired.

Preferably, the trench is perpendicular to the V-groove.

Also preferably, the trench divides the V-groove into groove sections of equal length. Preferably, the groove sections are at least 200 or 1000 microns long. Alternatively, the groove sections can be 10, 50, or 100 microns long.

The present invention includes a method for making a fiber array having a wick stop trench. In this method, an optical fiber is disposed in the V-groove. The fiber is glued to front and rear groove sections in separate gluing steps. Optionally, different adhesives are used in gluing the front and rear groove sections. Also, rotational or longitudinal alignment can be provided for the fiber before the fiber is glued to the front groove section. In a final step, the wick stop trench is filled with adhesive, and the adhesive is cured.

DESCRIPTION OF THE FIGURES

FIGS. 10a–10b illustrate a preferred method for making the present fiber array with a filled wick stop trench.

FIG. 11 shows a close-up side view of the wick stop trench, illustrating a fillet boundary.

FIG. 12 shows a close-up side view of the wick stop trench, illustrating a fillet boundary that extends to the bottom of the wick stop trench.

DETAILED DESCRIPTION

A V-groove chip according to the present invention has a wick stop trench that prevents adhesive from wicking the entire length of a V-groove. The wick stop trench is perpendicular to the V-groove and preferably deeper than the V-groove. The wick stop trench divides the V-groove into groove sections which can be glued separately in distinct gluing steps. The ability to secure a fiber in multiple gluing steps facilitates improved fiber positioning. The present invention is particularly well suited for accurate longitudinal and rotational positioning of an optical fiber in a V-groove.

Figure 1:
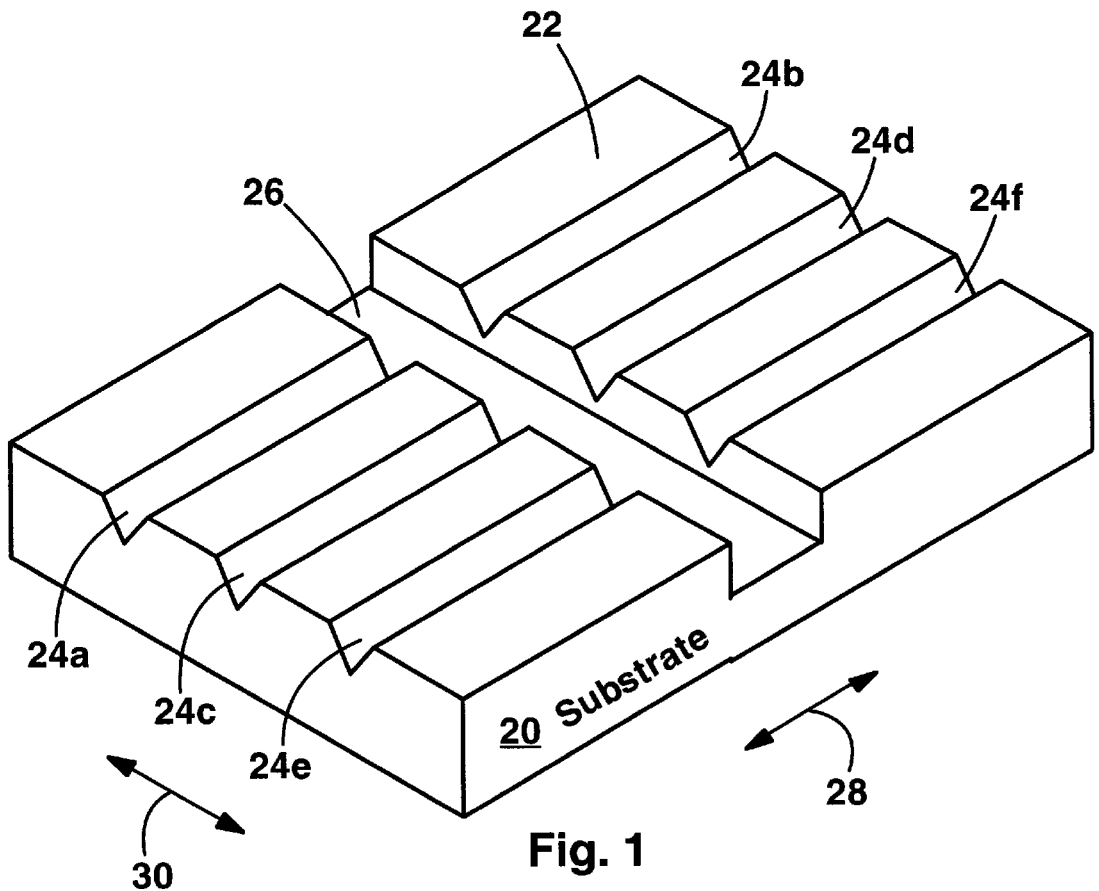
FIG. 1 is a V-groove chip according to the present invention.

FIG. 1 shows a V-groove chip according to a preferred embodiment of the present invention. The V-groove chip has a substrate 20 with a top surface 22. V-grooves 24a–f are disposed in the substrate 20. A wick stop trench 26 intersects the V-grooves 24a–f. Groove sections 24a–b are aligned across the wick stop trench 26 and in the present application are considered to comprise a single V-groove. Similarly, groove sections 24c–d and 24e–f are aligned and considered to comprise single V-grooves.

V-groove sections 24a–f are aligned in a longitudinal direction 28, and the wick stop trench 26 is aligned in a transverse direction 30. Preferably, the wick stop trench 26 is perpendicular to the V-grooves 24a–f.

Also preferably, the substrate 20 is made of single crystal silicon, and the top surface 22 is aligned with the <100>crystal plane. V-grooves 24a–f are preferably made by wet anisotropic orientation dependent etching, (e.g. using KOH) as is known in the art of silicon micromachining. The wick stop trench 26 is preferably made by a dicing saw, and can have a wide range of depths and widths. The wick stop trench 26 is preferably deeper than the V-grooves 24a–f. Alternatively, the wick stop can be made by any other micromachining technique (e.g. reactive ion etching is a possibility). The location and dimensions of the wick stop trench do not need to be precisely defined.

It is noted that V-groove chips are sometimes made from quartz or similar materials with V-grooves formed by grinding. The present invention is equally applicable to such V-groove chips.

Figure 2:
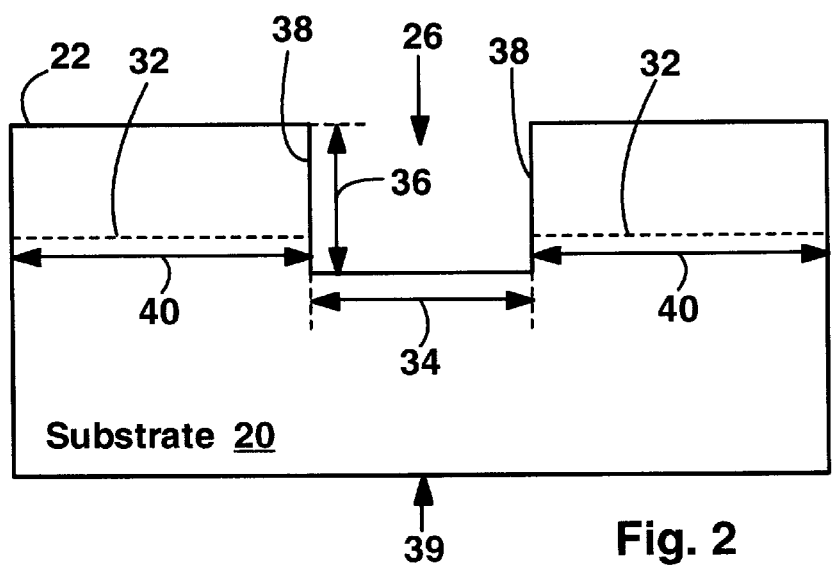
FIG. 2 is a side view of a V-groove chip of the present invention.

FIG. 2 shows a side view of the wick stop trench 26. Dotted lines 32 indicate the bottom corners of the V-grooves 24a–f. The wick stop trench has sidewalls 38. In some embodiments, the sidewalls 38 are vertical (i.e. perpendicular to the top surface). The sidewalls 38 are vertical in embodiments where the trench is made using a dicing saw. The wick stop trench 26 has a width 34 and a depth 36. As noted, the wick stop trench is preferably deeper than the V-grooves (i.e. deeper than the dotted lines 32). The wick stop trench may be slightly deeper than the V-grooves (e.g. 50, 100, or 200 microns deeper than the V-grooves); the wick stop trench may also be slightly shallower than the V-grooves (e.g. 5, 10, or 20 microns shallower. In either case, the wick stop trench must be deep enough to stop capillary action of adhesive between the V-groove and a fiber disposed in the V-groove. The required depth may depend on the size of the optical fiber, the viscosity of the adhesive, and the wetting properties of the chip, optical fiber and adhesive.

The trench width 34 can be in the range of 20–500 microns. Preferably, the width 34 is about 150 microns, or in the range of 100–200 microns. The trench width should be kept relatively short to prevent microbending of an optical fiber in the V-groove. The trench can be relatively wide (e.g. 1–3 millimeters) although this is not preferred.

Preferably, the wick stop trench 26 is centered on a midpoint 39 of the v-grooves so that the V-grooves are divided into sections 40 of equal length. Alternatively, the wick stop trench 26 is located off the midpoint 39 so that the V-grooves are divided into unequal lengths. In this case, each section of the V-grooves should be at least 50–200–500 microns long. More preferably, each length is at least 2–4 millimeters long.

Figure 3A:
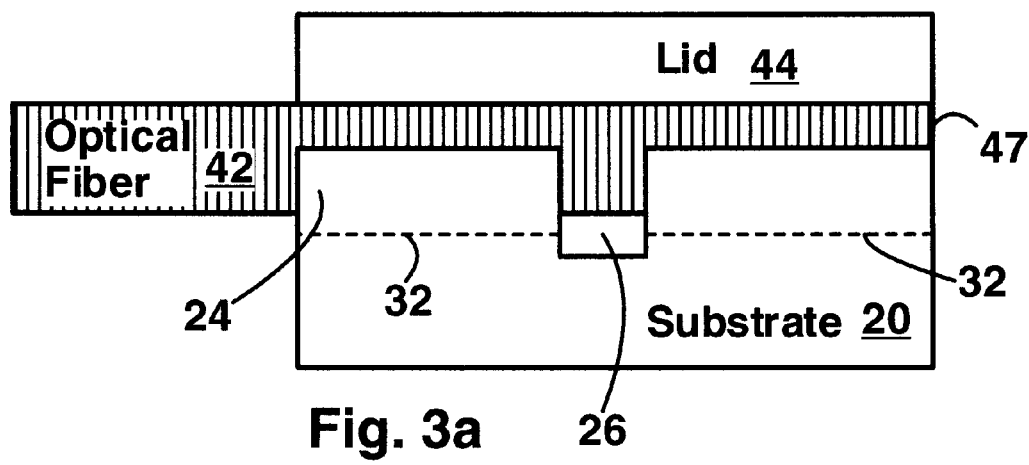
FIGS. 3a–b are side views of V-groove arrays of the present invention.

FIG. 3a shows a side view of an optical fiber array according to the present invention. An optical fiber 42 is disposed in the V-groove 24. Dotted line 32 indicates the bottom of the V-groove 24. A lid 44 is disposed on top of the optical fiber and holds the fiber 42 in the V-groove. The lid 44 can be made of glass, silica or silicon, for example. The wick stop trench 26 may be filled with adhesive, or may be empty. Also, the lid 44 can be replaced with a V-groove chip (with or without a wick stop trench). A front face 47 of the array is preferably polished for optical connection to other optical components.

Figure 3B:
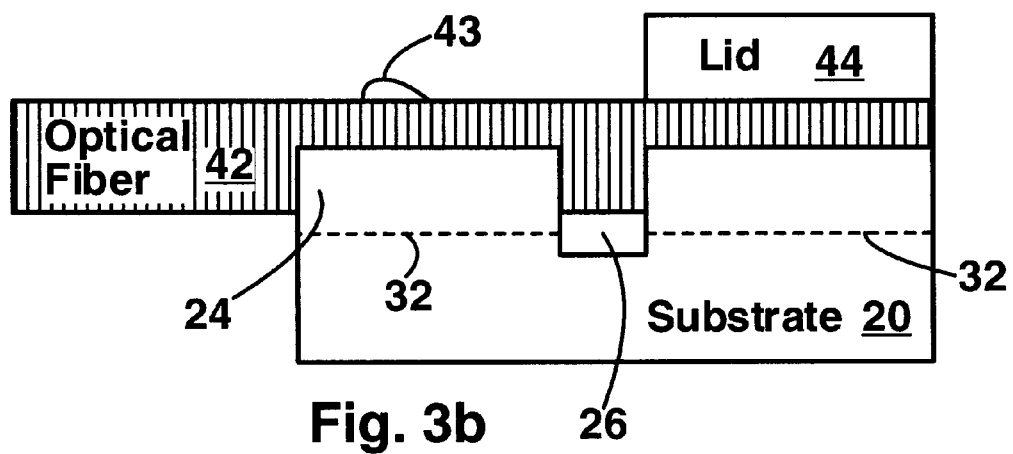

FIG. 3b shows an alternative embodiment where the lid 44 only covers one front length 45 of the V-groove. This embodiment may be useful if hardened adhesive residue 43 is adhered to the optical fiber 42 because such adhesive residue can prevent the proper placement of the lid.

Figure 4A:
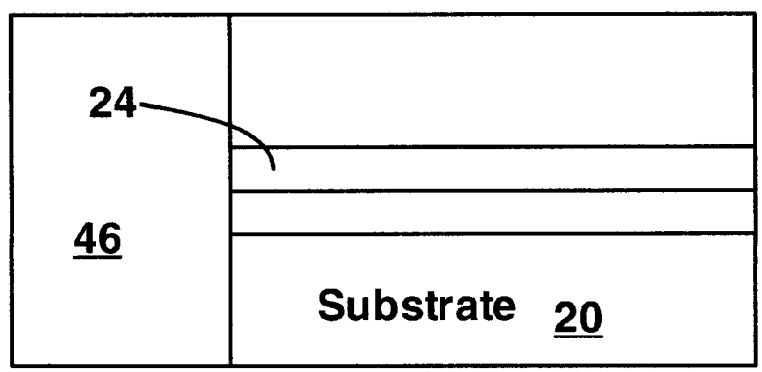
FIGS. 4a–b illustrate a preferred method for making the present invention.
Figure 4B:
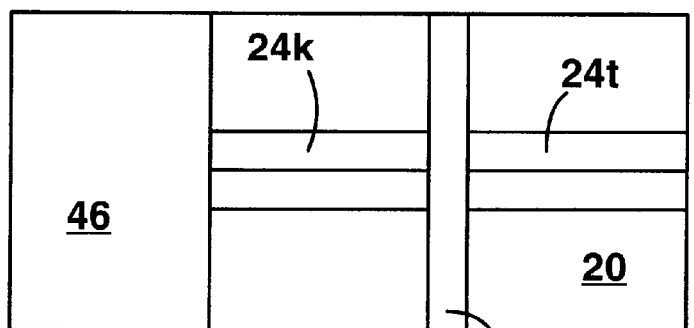

FIGS. 4a–b illustrate a method for making the chips of the present invention. In FIG. 4a, a V-groove 24 is formed in a single crystal silicon substrate 20 using wet anisotropic etching. Optionally, a recessed area 46 for bonding coated fibers is etched to a level as deeper than the V-grooves. Next, in FIG. 4b, the wick stop trench 26 is cut across the V-groove 24, dividing the V-groove into front groove section 24t and rear groove section 24k. Groove sections 24k and 24t can be equal or unequal in length. Preferably, the trench 26 is cut using a dicing saw or similar device. Preferably, a large number of V-groove chips are cut with the dicing saw while still connected in wafer form.

Figure 5A:
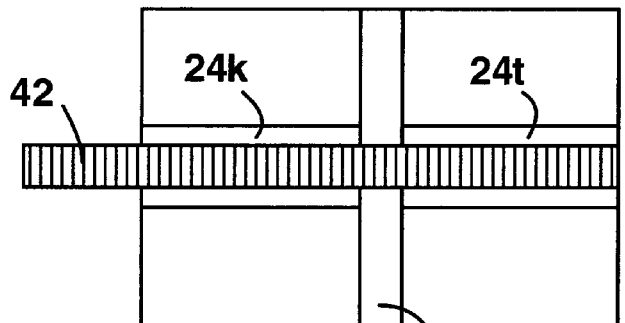
FIGS. 5a–d illustrate a preferred method of the present invention.
Figure 5B:
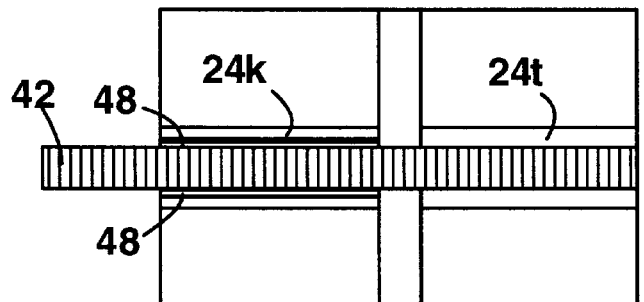
Figure 5C:
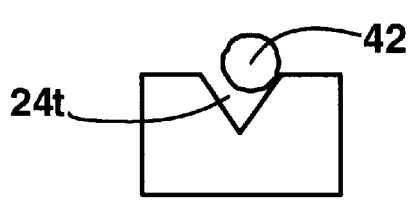

FIGS. 5a–5c illustrate a preferred method of the present invention for securing an optical fiber in a V-groove chip according to the present invention. First, in FIG. 5a, the optical fiber 42 is disposed in the front 24t and rear 24k V-groove sections. The rotational alignment of the fiber may be adjusted, and the longitudinal alignment of the fiber may be adjusted. Next, in FIG. 5b, adhesive 48 (e.g. UV curable epoxy) is disposed in the rear groove section 24k. The adhesive 48 travels by capillary action (wicking) along the rear groove section 24k and stops at the wick stop trench 26. The adhesive may partially fill the wick stop trench 26. The adhesive does not travel to the front groove section 24t because of the wick stop trench 26. Next, the adhesive in the rear groove section 24k is hardened using UV illumination. Hardening the adhesive 48 secures the rotational and longitudinal alignment of the optical fiber 42. At this point, the fiber 42 is not attached to the front groove section 24t.

It is noted that the fiber may not be accurately disposed in the front groove section 24t during or after adhesive 48 is set in the rear groove section 24k. This is because the fiber 42 is not pressed into the front groove section 24t. FIG. 5c illustrate a possible mispositioning of the fiber in the front groove section 24t.

Figure 5D:
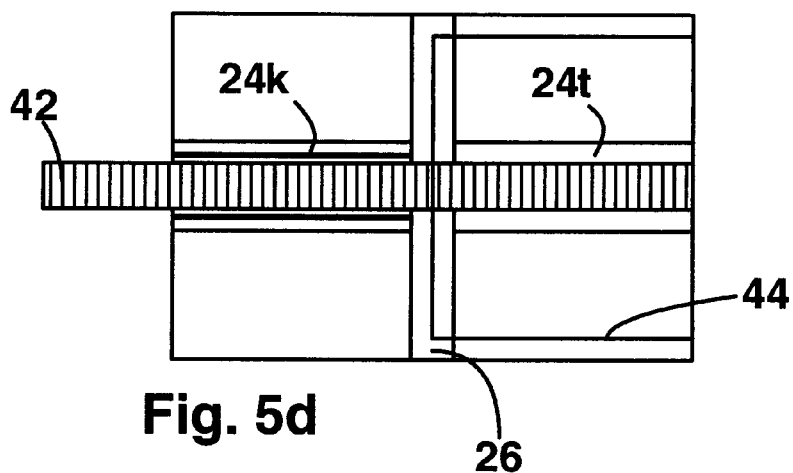

Next, in FIG. 5d, a lid 44 is placed on top of the fiber 42. In the embodiment shown, the lid 44 only covers the front groove section and does not cover the rear groove section

24k. Placement of the lid presses the optical fiber into the front groove section 24t thereby providing accurate positioning of the fiber. The rotational and longitudinal alignment of the fiber is fixed by the adhesive 48 in the rear groove section before the lid is placed. After the lid is placed, adhesive is disposed in the front groove section 24t from either the wick stop trench 26 or the front face 47 and hardened using UV illumination. Since the rotational/longitudinal alignment and position of the fiber with in the V-groove are set independently in two separate gluing steps, each alignment can be done with higher precision. In the prior art, rotational/longitudinal alignment and pressing of the fiber into the groove must be performed in the same gluing step.

The ability of the wick stop trench 26 to stop the adhesive travel is an essential feature of the present invention. Since the wick stop trench can control the movement of liquid adhesive, different portions of the optical fiber 42 can be glued in distinct gluing steps. The ability to glue different portions of the fiber in distinct steps provides for improved fiber alignment and other benefits in certain kinds of fiber arrays. This is because longitudinal/rotational alignment can be fixed in a separate step from pressing the fiber into the groove.

EXAMPLE 1
Polarization-maintaining Optical Fiber Array

The present invention is particularly well suited for making polarization-maintaining (PM) optical fiber V-groove arrays. A method for making PM fiber V-groove arrays according to the present invention includes the following steps:

1) Place a PM fiber in the rear groove section and front groove section.
2) Rotate the PM fiber until properly aligned.
3) Apply adhesive to the rear groove section and cure the adhesive, thereby fixing the rotational alignment.
4) Place a lid on the PM fiber and press the fiber into the front groove section to accurately position the fiber in the front groove section.
5) Apply adhesive to the front groove section and cure adhesive.

EXAMPLE 2
Optical Fiber Array with Longitudinally Located Fibers

Figure 6:
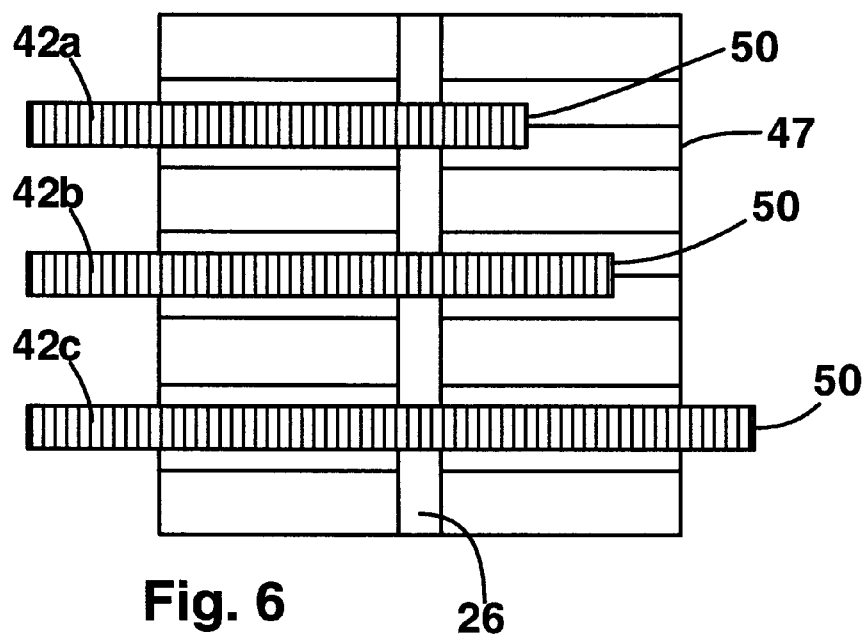
FIG. 6 is a top view illustrating longitudinal positioning according to the present invention.

FIG. 6 shows an optical fiber array where the optical fibers 42a–c are located longitudinally. Endfaces 50 are not flush (coplanar) with the front face 47 of the array and substrate. A method for making fiber V-groove arrays with longitudinally located fibers according to the present invention includes the following steps:

1) Place a fiber in the rear groove section and front groove section.
2) Longitudinally move the fiber until properly aligned.
3) Apply adhesive to the rear groove section and cure the adhesive, thereby fixing the longitudinal alignment.
4) Place a lid on the fiber and press the fiber into the front groove section to accurately position the fiber in the front groove section.
5) Apply adhesive to the front groove section and cure adhesive.

It is noted that a jig having fiber stops can be used to longitudinally locate the optical fibers in this embodiment.

It is noted that the present invention can be used in any situation where multiple gluing steps are desired. For example, different adhesives can be used in different groove sections. This may be useful, for example, where an adhesive having good polishing properties is used in the front groove section and a different adhesive having good adhesion/expansion properties is used in the rear groove section.

Figure 7:
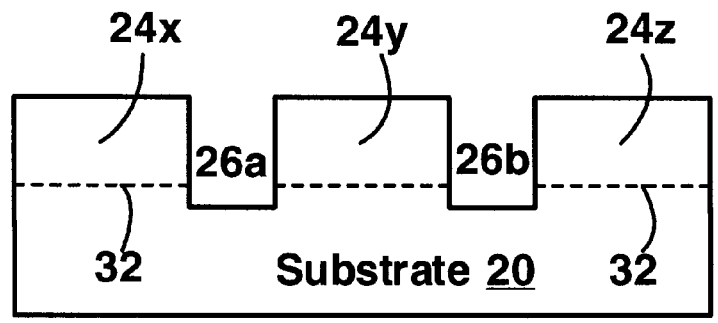
FIG. 7 is a side view of a V-groove chip having two wick stop trenches.

It is also noted that the present invention includes embodiments having more than one wick stop trench. FIG. 7, for example, shows a side view of a V-groove chip having two wick stop trenches 26a, 26b dividing the V-groove into three groove sections 24x, 24y, 24z.

Figure 8:
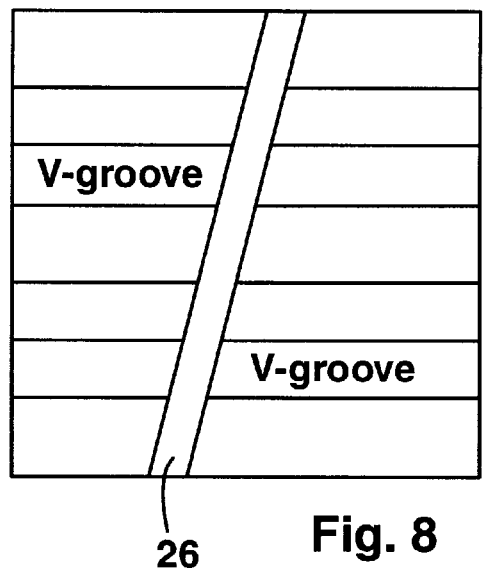
FIG. 8 is a top view of an embodiment where the wick stop trench is not perpendicular to the V-grooves.

It is also noted that the wick stop trench does not need to be perpendicular to the v-groove. The wick stop trench can be located at almost any angle provided that the wick stop prevents the wicking of adhesive. The wick stop trench could be oriented at 60 degrees with respect to the V-grooves, for example. FIG. 8 shows a top view of an embodiment with a nonperpendicular wick stop trench.

Figure 9:
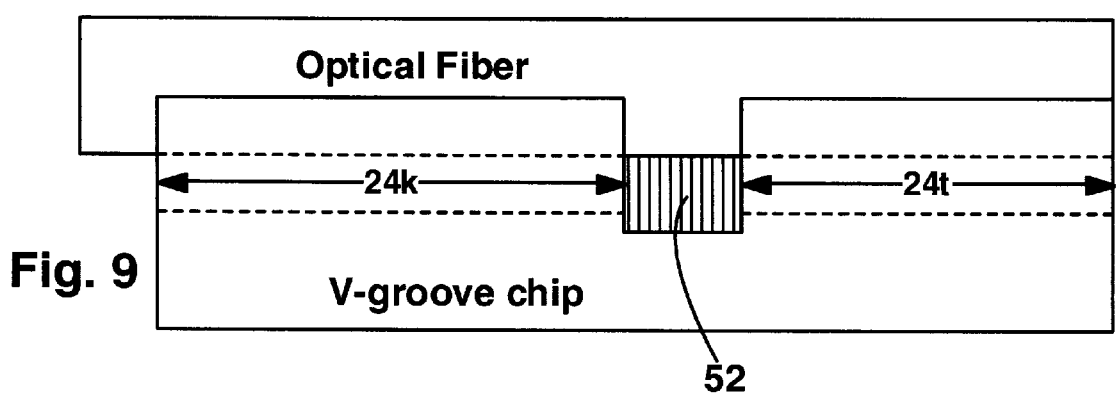
FIG. 9 shows a side view of the present fiber array having a filled wick stop trench.

FIG. 9 is a side view of a fiber array made according to a preferred embodiment of the present invention. The wick stop trench is filled (filled up to the bottom of the optical fiber) with hardened adhesive 52. Although the wick stop trench 26 functioned as a wick stop when liquid adhesive was placed into the rear groove section 24k, in the step of adhering the fiber to the front groove section 24t of the array, the wick stop trench 26 is filled with adhesive. The liquid adhesive flows from the wick stop trench into the front groove section 24t. Filling the wick stop trench with adhesive simplifies the task of adhering the front portions of the optical fibers to the front V-groove section, and provides other benefits.

Figure 10A:
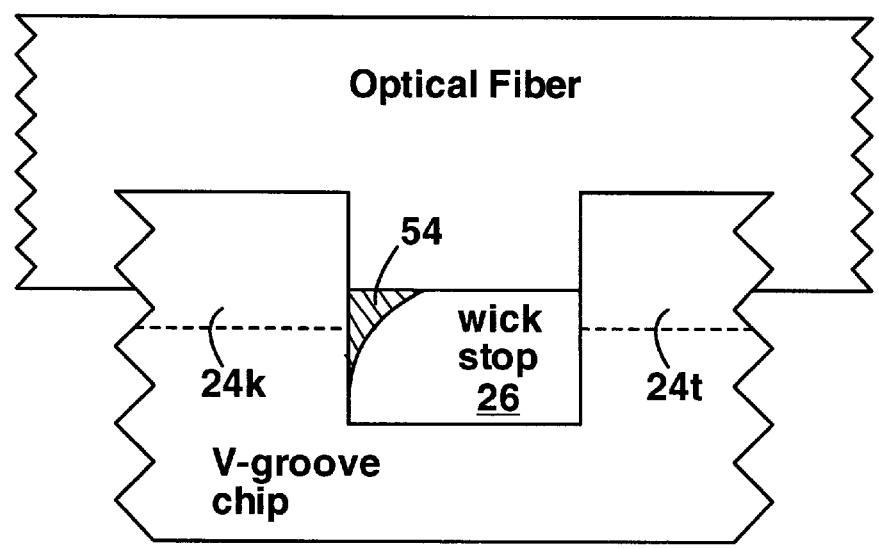

FIGS. 10a–10b illustrate a preferred method for making the fiber array with a filled wick stop trench. FIGS. 10a–10b Are close-up side views of the wick stop trench and optical fiber and only show a portion of the V-groove chip and fiber.

FIG. 10a The optical fiber is disposed in the V-groove 24k 24t. Liquid adhesive (e.g. UV-curable epoxy) is applied to the rear groove section 24k, forming a fillet 54 due to surface tension forces. The wick stop trench 26 prevents the liquid adhesive from flowing into the front groove section 24t. The liquid adhesive is cured so that the fillet 54 becomes solid. Before application and curing of the adhesive in the rear groove section 24k, longitudinal and/or rotational alignment of the optical fiber may be provided.

FIG. 10b The wick stop trench is filled with liquid adhesive 56. Preferably, the wick stop trench is filled completely (up to the top surface of the V-groove chip).

The liquid adhesive flows into the front groove section 24t by capillary action as the wick stop trench is filled. The adhesive in the wick stop and front groove section is then cured. A fillet boundary 58 may be present. The fillet boundary 58 indicates that the two adhesive applications were solidified in separate steps.

An adhesive-filled wick stop trench provides several distinct advantages:

1) A filled wick stop trench provides improved strength for the V-groove chip. If the wick stop trench is not filled, then the chip is substantially weakened by the wick stop trench.
2) Applying adhesive to the front groove sections by filling the wick stop trench simplifies the task of applying adhesive to the front groove sections. Only a single adhesive application is necessary; a separate adhesive application is not required for each optical fiber in the fiber array.
3) Filling the wick stop trench reduces the occurrence of trapped air bubbles in the fiber array. Trapped air bubbles are often formed if the wick stop trench is not filled and a lid is glued onto the fiber array. Trapped air bubbles are best avoided because they can cause adhesive delamination when the array is exposed to temperature cycling.

Although the fillet boundary is a preferred feature of the present invention, it is not essential. The present invention includes a fiber array having a wick stop trench filled with adhesive.

FIG. 11 shows a magnified side view of the filled wick stop trench having a fillet boundary 58 created by two separate application and solidification steps. The fillet boundary will be readily apparent if different adhesives are used in the front and rear groove sections. If the same adhesive is used in the front and rear groove sections, the fillet boundary may be difficult to observe. An optical fiber array made according to the preferred method of the present invention will have a fillet boundary, although the fillet boundary may be difficult to observe.

FIG. 12 shows an alternative embodiment where the fillet boundary extends to the bottom of the wick stop trench. In this embodiment, the bottom of the wick stop trench was partially wetted by the first adhesive application.

Figure 13:
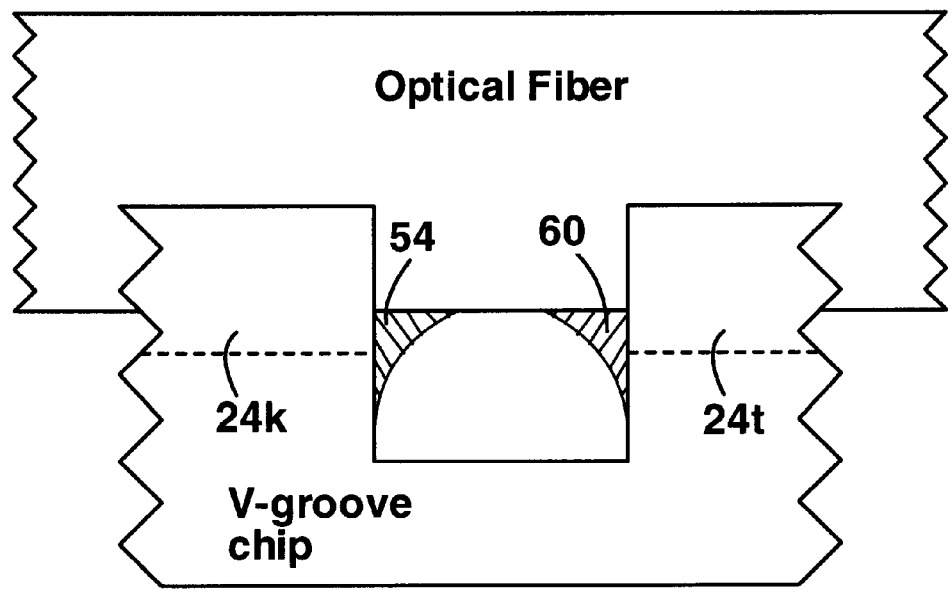
FIG. 13 shows a close-up side view of a fiber array having two fillets created by separate adhesive applications to the front groove section and rear groove section.

FIG. 13 shows another embodiment of the present invention where both the front groove section 24t and rear groove section 24k are filled with liquid adhesive so that two fillets 54, 60 are formed. The embodiment of FIG. 13 is made by applying liquid adhesive to the front groove section instead of the wick stop trench.

Figure 14:
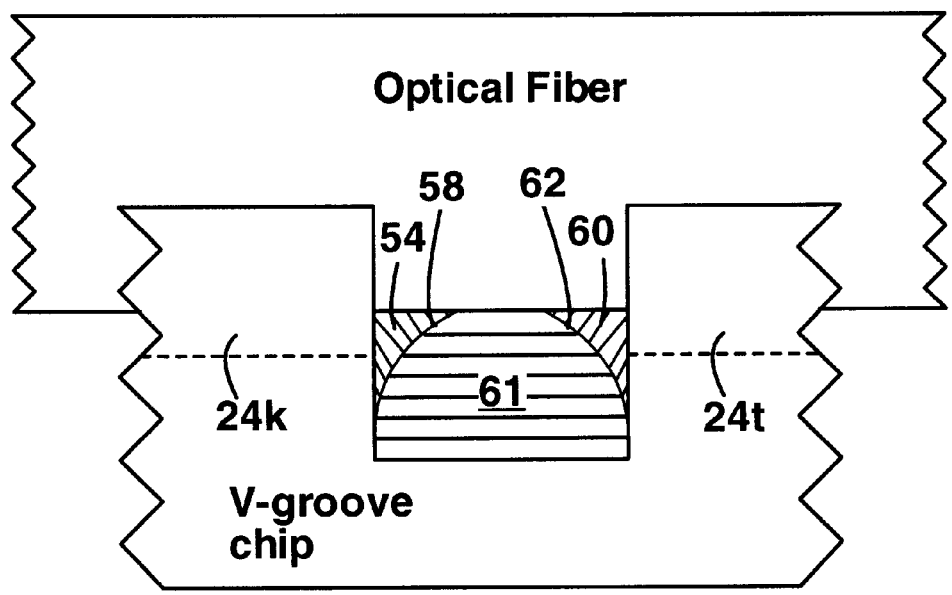
FIG. 14 show a clasp side view of a fiber array with a fillet wick stop trench and two fillet boundaries. The fiber array of FIG. 14 is made by filling the wick stop trench of the fiber array of FIG. 13.

FIG. 14 shows yet another embodiment where the wick stop trench of the fiber array of FIG. 13 is filled with liquid adhesive 61 (in a third adhesive application). The fiber array of FIG. 14 has two fillet boundaries 58, 62.

It is noted that a fiber array made according to the method of the present invention will have a fillet boundary.

It is further noted that the V-groove does not necessarily have a pointed, V-shaped bottom. The V-groove can have a flat bottom. V-grooves with flat bottoms are commonly used in the art and are readily made in silicon using wet anisotropic etching techniques.

Although the present invention has been described with reference to using V-grooves, the present invention can be used with grooves of any cross sectional shape. For example, the present invention can be used with grooves having U-shapes or rectangular shapes. Also, the wick stop trench can have essentially any shape (e.g. V-shaped, U-shaped), provided that it functions as a wick stop.

Also, the V-groove chips of the present invention can be made of materials other than silicon including ceramic, quartz, plastic and metal.

It will be clear to one skilled in the art that the above embodiment may be altered in many ways without departing from the scope of the invention. Accordingly, the scope of the invention should be determined by the following claims and their legal equivalents.

What is claimed is:

1. An optical fiber array, comprising:
    a) a substrate having a top surface;
    b) a groove disposed in the top surface;
    c) a wick stop trench intersecting the groove so that the groove is divided into groove sections;
    d) an optical fiber disposed in the groove sections and crossing the wick stop trench;
    e) solidified adhesive filling the wick stop trench.
2. The optical fiber array of claim 1 wherein the solidified adhesive has a fillet boundary.

3. The optical fiber array of claim 2 wherein the fillet boundary extends to the bottom of the wick stop trench.

4. The optical fiber array of claim 1 wherein the wick stop trench is deeper than the groove.

5. The optical fiber array of claim 1 wherein the substrate is made of single crystal silicon and the groove is a crystallographically defined V-groove.

6. The optical fiber array of claim 1 wherein the wick stop trench has vertical sidewalls.

7. The optical fiber array of claim 1 wherein the wick stop trench is a dicing saw cut trench.

8. The optical fiber array of claim 1 wherein the wick stop trench has a width in the range of 20–500 microns.

9. The optical fiber array of claim 1 wherein the wick stop trench has a width in the range of 100–200 microns.

10. The optical fiber array of claim 1 further comprising a second wick stop trench so that the groove is divided into three groove sections, and wherein the second wick stop trench is filled with solidified adhesive.

11. The optical fiber array of claim 1 wherein the wick stop trench intersects a midpoint of the groove so that the groove is divided into two equal-length groove sections.

12. The optical fiber array of claim 1 wherein the groove sections are at least 200 microns long.

13. The optical fiber array of claim 1 wherein the groove sections are at least 1000 microns long.

14. The optical fiber array of claim 1 wherein the optical fiber is a polarization maintaining optical fiber.

15. The optical fiber array of claim 1 wherein the optical fiber has a fiber endface, and wherein the substrate has a front face, and wherein the fiber endface is not coplanar with the substrate front face.

16. The optical fiber array of claim 1 wherein the solidified adhesive comprises two fillet boundaries adjacent to the front and rear groove sections.

17. A method for making an optical fiber array, comprising the steps of:
    a) providing a groove chip having a wick stop trench and a groove, wherein the groove is divided by the trench into a front groove section and a rear groove section;
    b) disposing an optical fiber in the front and rear groove sections so that it crosses the trench;
    c) applying liquid adhesive to the rear groove section so that the liquid adhesive flows along the optical fiber up to the wick stop trench and forms a fillet;
    d) curing the adhesive applied in step (c);
    e) after step (d), filling the wick stop trench with adhesive so that the liquid adhesive flows into the front groove section;
    f) curing the adhesive applied in step (e).

18. The method of claim 17 wherein different adhesives are used in steps (c) and (e).

19. The method of claim 17 further comprising the step of providing rotational alignment of the optical fiber before step (d).

20. The method of claim 17 further comprising the step of providing longitudinal alignment of the optical fiber before step (d).

21. An optical fiber array made according to the method of claim 17 so that the fiber array has a fillet boundary.

22. A method for making an optical fiber array, comprising the steps of:
    a) providing a groove chip having a wick stop trench and a groove divided into a front groove section, wherein the groove is divided by the trench into a front groove section and a rear groove section;

b) disposing an optical fiber in the front and rear groove sections so that it crosses the trench;

c) applying liquid adhesive to the rear groove section so that the liquid adhesive flows along the optical fiber up to the wick stop trench and forms a fillet;

d) curing the adhesive applied in step (c);

e) applying liquid adhesive to the front groove section so that the liquid adhesive flows along the optical fiber up to the wick stop trench and forms a second fillet;

f) curing the adhesive applied in step (e);

g) after step (f), filling the wick stop trench with adhesive;

h) curing the adhesive applied in step (g).

23. The method of claim 16 wherein different adhesives are used in steps (c) and (e).

24. The method of claim 16 further comprising the step of providing rotational alignment of the optical fiber before step (d).

25. The method of claim 16 further comprising the step of providing longitudinal alignment of the optical fiber before step (d).

26. An optical fiber array made according to the method of claim 22 so that the fiber array has two fillet boundaries.

* * * * *